Nov. 20, 1956 J. L. FISH 2,771,049

SOLDERING DEVICE

Filed March 1, 1955

INVENTOR.

James L. Fish

BY

Mueller & Aichele

Attys

United States Patent Office 2,771,049

Patented Nov. 20, 1956

2,771,049

SOLDERING DEVICE

James L. Fish, Chicago, Ill., assignor to Motorola, Inc., Chicago, Ill., a corporation of Illinois Application March 1, 1955, Serial No. 491,489

4 Claims. (Cl. 113—59)

This invention relates to soldering devices and more particularly to an improved device for selectively applying solder to prelocated points on a plated or printed circuit panel assembly, or the like.

Tremendous improvements have been made possible in the manufacture of electronic equipment by the use of printed or plated circuit panels. As is well known, such panels are generally composed of a phenol resin laminate or other insulating material with an electrical design plated or otherwise formed on one or both surfaces thereof. The assembly usually includes metallized eyelets extending through the panel and which receive the pigtail or other connections of electrical and electronic components that are to be supported by the panel and connected to the electrical design formed thereon. These connections are soldered to the electrical design on the panel during the manufacturing process either manually or by dip-soldering techniques, or for higher efficiency by automatic soldering machines.

It is often desirable to remove certain ones of the soldered components from the panel or to resolder certain connections that, for example, have failed under test. This removal and resoldering can, of course, be done manually but that is a time-consuming operation and one that is difficult to carry out due to the minuteness of these solder connections on a usual plated circuit panel and because of the limited space.

One object of the present invention is to provide an improved and simple device that may be used to solder selectively any one or more of a plurality of prelocated solder points or areas on a plated circuit panel assembly, so as to enable individual components of the assembly to be removed or replaced, or individual connections to be resoldered.

A more general object of the invention is to provide an improved device for applying solder to prelocated localized areas on a body to be soldered.

Yet another object of the invention is to provide such an improved device for applying solder to prelocated areas of a body, which device is emminently simple in its construction and easy to operate.

A feature of the invention is the provision of a soldering device which includes a series of upwardly extending open-ended tubes positioned to correspond to the various distinct soldering areas on a plated circuit panel, with all the tubes terminating in a common plane, and which also includes means for selectively displacing solder up the tubes to form solder meniscuses at the respective upper ends thereof so as to apply solder to prelocated localized points on a plated circuit panel supported over the top of the tubes.

Another feature of the invention is the provision of such a soldering device in which the solder displaced up each such tube may be independently controlled so that solder can be applied to any one or more of the solder areas of the plated circuit panel corresponding to a particular component on the panel.

The above and other features of the invention which are believed to be new are set forth with particularity in the appended claims. The invention itself, however, together with further objects and advantages thereof, may best be understood by reference to the following description when taken in conjunction with the accompanying drawing in which:

Figure 1:
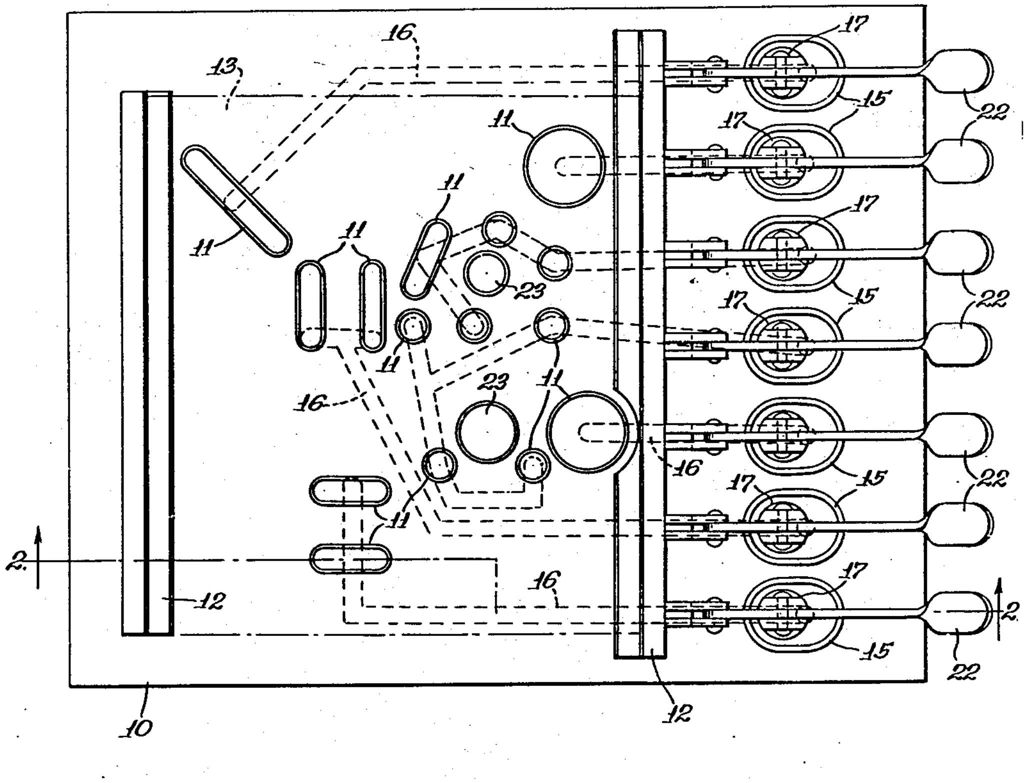
Fig. 1 is a plan view of the soldering device of the present invention.
Figure 2:
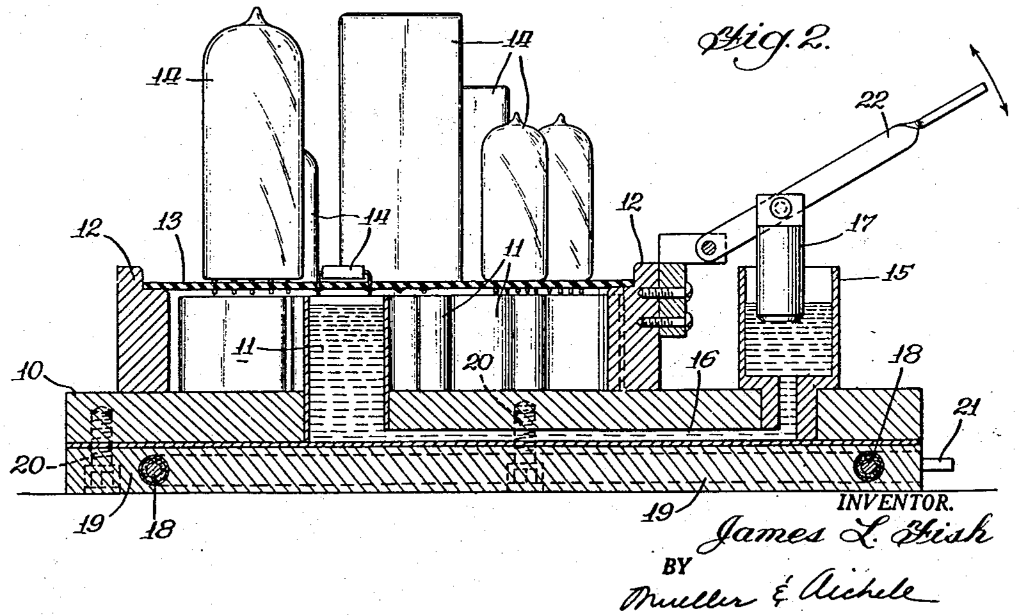
Fig. 2 is a sectional view taken along the line 2—2 of Fig. 1 and additionally showing a plated circuit panel assembly supported over the device to be selectively soldered thereby.

The invention provides a device for selectively applying solder to prelocated areas of a plated circuit panel assembly, or the like, and the device comprises a base structure and a plurality of open-ended tubes extending upwardly from the base structure along spaced parallel vertical axes, with the tubes terminating at their upper end in a common horizontal plane. Bracket means is provided for supporting a plated circuit panel assembly over the tubes in a horizontal plane spaced a selected distance from the upper ends of the tubes, and the tubes are positioned to correspond to prelocated localized areas on the underside of the plated circuit assembly to which solder is to be applied. A series of upwardly extending hollow members, which will be referred to herein as "wells," are positioned at one end of the base, the wells having a height corresponding to the height of the tubes (preferably slightly greater). A corresponding series of channels extend through the base and interconnect respective ones of the tubes with the wells. A series of solder-displacing members are provided which extend into respective ones of the wells and are floated on molten solder in the wells. A corresponding series of pivoted keys are coupled to respective ones of the pistons and are manually operable to force any one of the solder-displacing members downwardly into the corresponding wells so as to displace solder through the corresponding channel and upwardly in the tube or tubes interconnected thereto a controlled distance to form a solder meniscus at the top of each such tube, with the meniscus in soldering contact with a corresponding solder area of the plated circuit panel assembly supported thereover.

Referring now to the drawing, the device illustrated therein includes a base 10 which may be composed of any suitable metal such as steel, which may be chrome plated. A multiplicity of open-ended tubes 11 are supported on base 10 and extend upwardly therefrom with their respective axes being vertical and spaced one from the other. The tubes 11 terminate at their upper end in a common horizontal plane.

Bracket means 12 is provided on base 10, and this bracket supports a plated circuit panel assembly such as the panel 13 over the tops of tubes 11 in a horizontal plane spaced a selected distance above the upper end of the tubes. Panel 13 supports a series of electronic and electrical components 14 thereon, and these components have pigtail or other connections which extend through metal eyelets in the panel into contact with the electric circuit design formed on at least one surface of the panel. Under normal course of events, these connections are soldered to the electrical design on the panel; and one function of the device of the present invention is to provide a resoldering for any contacts whose initial soldering has failed or to allow any component to be removed. To accomplish this, the tubes 11 are positioned to correspond to prelocated solder areas on the under side of the plated circuit assembly coinciding with the various solder contacts of the components.

A series of hollow vessels or wells 15 are positioned at one end of the base 10, and these wells extend upwardly to a height corresponding to the height of the tubes or higher. A corresponding series of individual channels 16 extend through base 10 from each one of the wells 15 to one or more of the tubes 11, the arrangement being such that each well serves all the tubes corresponding to the solder contacts of a component on the panel.

A displacing plunger 17 extends into each of the wells 15 and floats on molten solder that is introduced into each well and which flows through the corresponding channels to fill tubes 11 to a level equal to that in the wells, which level is controlled to be below the top of the tubes. The solder may be maintained molten in the wells, channels and tubes by electrical heating coils 18. The heating coils may be embedded in a metal plate 19 composed, for example, of chrome-plated steel and which may be secured to the bottom of base 10 by screws 20. The coils 18 are connected to external terminals such as terminal 21 which are adapted to be connected to a suitable power source.

Each plunger 17 has a pivoted key 22 associated therewith, the key being pivoted to base 10 at one end, as shown in the drawings. Normally, the keys are in the illustrated upper position due to the fact that each plunger 17 is floating on the solder within its corresponding well. Alternately, the frictional pivoted force of the keys may be made sufficient to support the plungers. However, the keys may be individually depressed manually to force any one of the plungers 17 downwardly into a corresponding well 15 so as to displace the molten solder upwardly in the tube or group of tubes interconnected with that well so as to form a solder meniscus at the top of such tube, or group of tubes, and in soldering contact with the corresponding solder area of the plated circuit assembly supported thereover.

It is usually desirable to provide an asbestos sheet or other suitable heat absorbing material on base 10 between the tubes 11 so as to protect the plated circuit panel 13 as much as possible from the radiated and convected heat of the device, and to conserve heat. Also, holes 23 may be provided in base 10 to provide clearance for shafts and the like hanging down from panel 13.

It is apparent that convenient soldering may be made to any of the localized prelocated solder areas on the plated circuit panel assembly, and this is achieved merely by placing the assembly in the bracket means 12 and depressing as many of the keys 19 as there are solder areas that require soldering. The device operates quickly and efficiently to provide clean soldering connections with a minimum of time and effort.

To replace any of the components on panel 13 having connections soldered to the circuit on the panel, it is merely necessary to depress the key 22 corresponding to the solder contacts of that component. This brings molten solder to the top of the proper tubes to melt the soldered connections. The component can then be removed and replaced by another which will be firmly soldered in place when the key is returned to its upper position.

I claim:

1. A device for selective application of solder to a plurality of prelocated localized areas on a printed circuit panel assembly, including in combination, a base structure, a plurality of open-ended tubes extending upwardly from said base structure, means for supporting a panel assembly in a fixed position over the tops of said tubes, a well for molten solder positioned on said base structure and extending upwardly therefrom, a channel extending through said base structure to interconnect said well and said tubes, a solder displacing member positioned for movement in said well for displacing molten solder upwardly in said tubes into soldering contact with selected areas of the panel assembly supported thereover, and said tubes being of sufficient diameter and being capable of holding a quantity of molten solder therein operable to transfer sufficient heat to the selected areas on the panel assembly to maintain said areas above the minimum temperature required for soldering and thereby being the only source of heat required for soldering.

2. A device for selectively applying solder to a plurality of localized prelocated areas of a body to be soldered, including in combination, a base structure, a plurality of open-ended tubes extending upwardly from said base structure and positioned to correspond to prelocated solder areas on a body supported thereover, means for supporting a body in a fixed position over the tops of said tubes and closely adjacent thereto, conduit means for supplying molten solder to said tubes, solder displacing means for forcing solder through said conduit means upwardly in said tubes and into soldering contact with the prelocated solder areas of the body supported thereover, and said tubes each being of sufficient diameter and being capable of holding a quantity of molten solder therein operable to transfer sufficient heat to the respective solder areas to maintain the solder areas above the minimum temperature required for solder and thereby being the only source of heat required for soldering.

3. A device for selectively applying solder to a plurality of localized pre-located areas of a body to be soldered including in combination, a base structure, a plurality of open-ended tubes extending upwardly from said base structure and positioned to correspond to localized prelocated solder areas on a body supported thereover, means for supporting a body in a fixed position over the upper ends of said tubes and closely adjacent thereto, conduit means for supplying molten solder to separate ones of said tubes, a plurality of separately operated solder displacing means for forcing solder upwardly in selected ones of said tubes and into soldering contact with selected solder areas of the body supported thereover, and said tubes each being of sufficient diameter and being capable of holding a quantity of molten solder therein operable to transfer sufficient heat to the respective solder areas to maintain the solder areas above the minimum temperature required for solder and thereby being the only source of heat required for soldering.

4. A device for selectively applying solder to prelocated areas of a printed circuit panel, including in combination, a base structure, a plurality of open-ended tubes extending upwardly from said base structure along spaced parallel vertical axes and terminating at the upper ends in a common horizontal plane, bracket means for supporting a plated circuit panel in a fixed position over said tubes in a horizontal plane spaced a selected distance from said upper ends, said tubes being positioned to correspond to localized prelocated solder areas on the underside of the plated circuit panel, a series of upwardly extending wells positioned on said base structure, a series of channels extending in said base structure to interconnect respective ones of said tubes and said wells, a plurality of solder displacing plungers extending into respective ones of said wells to be supported by molten solder therein, a plurality of pivoted keys connected to respective ones of said plungers and individually operable to force said plungers downwardly into selected ones of said wells to displace solder upwardly in the tubes connected therewith and into soldering contact with corresponding localized solder areas of the printed circuit panel supported thereover, and said tubes each being of sufficient diameter and being capable of holding a quantity of molten solder therein operable to transfer sufficient heat to the respective solder areas to maintain the solder areas above the minimum temperature required for soldering and thereby being the only source of heat required for soldering.

References Cited in the file of this patent

UNITED STATES PATENTS

| | | |
|---|---|---|
| 1,193,425 | Robinson et al. | Aug. 1, 1916 |
| 1,318,871 | Heine | Oct. 14, 1919 |
| 1,837,962 | Hensgen | Dec. 22, 1931 |
| 1,947,689 | Young | Feb. 20, 1934 |
| 2,619,063 | Anderson | Nov. 25, 1952 |